Figure 1:
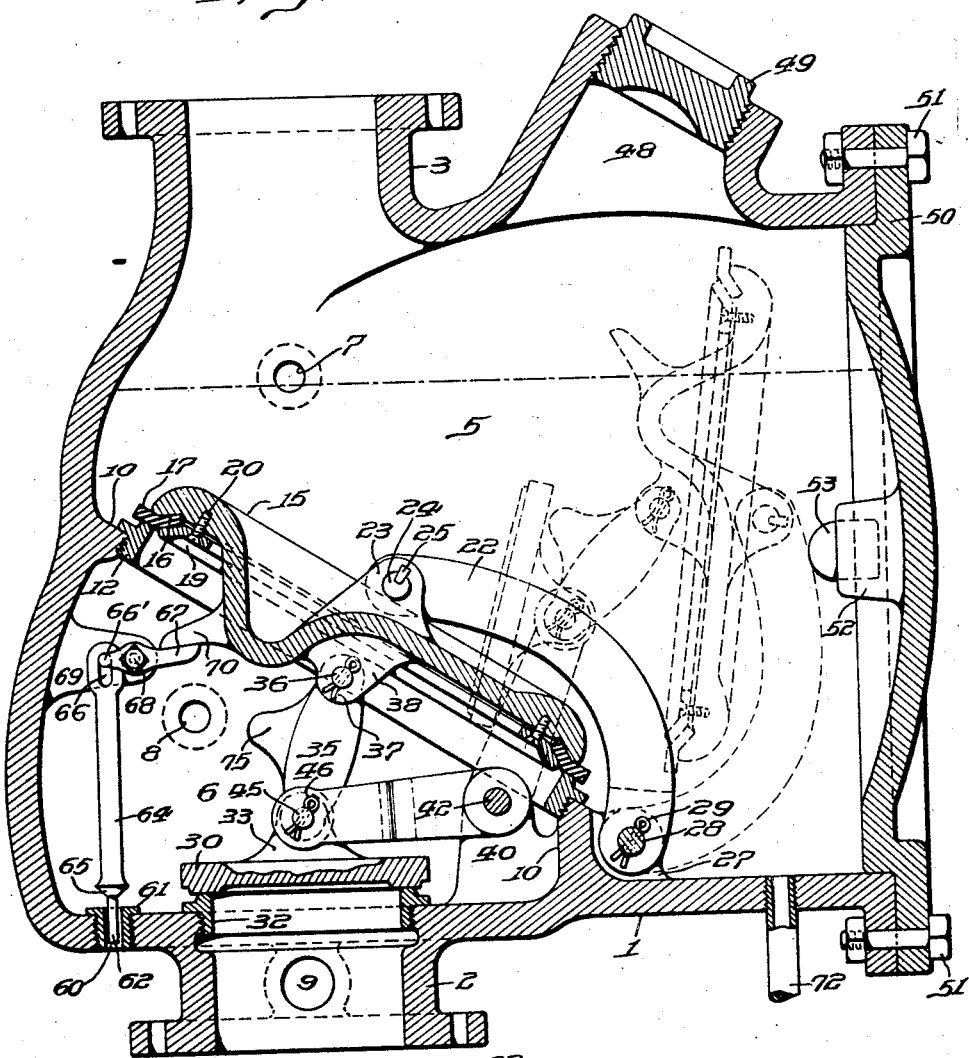

Jan. 12, 1926.

L. M. LEWIS 1,569,326

DRY PIPE VALVE

Filed Nov. 12, 1921

WITNESS
F.J. Hartman.

INVENTOR
Leroy M. Lewis
BY
Bloomh, Moulton & Helker
ATTORNEYS

Patented Jan. 12, 1926.

1,569,326

UNITED STATES PATENT OFFICE.

LEROY M. LEWIS, OF MERION, PENNSYLVANIA.

DRY-PIPE VALVE.

Application filed November 12, 1921. Serial No. 514,440.

*To all whom it may concern:*

Be it known that I, LEROY M. LEWIS, a citizen of the United States, and a resident of Merion, county of Montgomery, and State of Pennsylvania, have invented certain new and useful Improvements in Dry-Pipe Valves, of which the following is a specification, reference being had to the accompanying drawing.

Dry pipe valves for use in automatic sprinkler systems comprise a water valve and an air valve and are ordinarily so constructed that the water valve will be held closed against the water pressure in the supply pipe by air in the distributing pipes at a pressure materially less than that of the water in the supply pipe. In certain types of these valves the mechanical advantage necessary to secure this result is obtained by making the air valve, that is, the valve against which the air pressure is exerted, of greater area than the area of the water valve, both valves being suitably connected, so that on a sufficient diminution of the air pressure in the distributing pipes both valves are free to open substantially simultaneously to permit the water from the supply pipe to pass through the dry pipe valve and into the distributing pipes.

It has been found convenient in the construction of dry pipe valves of this general character to locate the seat for the air valve in angular relation with the seat for the water valve, for example, by arranging the latter in a horizontal plane and the former in a plane inclined to the horizontal, the air valve seat being positioned above the water valve seat. Under these conditions, however, it is found that the air pressure acting on the air valve has a tendency to force the water valve across the face of the water valve seat since the force exerted by the air is transmitted to the water valve in an angular direction with respect to its seat, one component of the force being thus operative to force the valve against the seat and the other tending to slide it thereacross, this tendency of course becoming more pronounced as the angle at which the force is transmitted is increased, resulting, among other disadvantages, in the necessity for increasing the air pressure in order to effect tight closure of the water valve against a given water pressure, as well as in the deformation or abrasion of the water valve and its seat which may, in time, interfere with the proper functioning of the water valve.

A principal object of my invention is to provide a dry pipe valve of the differential type of improved and simple construction and in which the air valve seat is arranged in angular relation with the water valve seat; said valve embodying means whereby any tendency of the water valve to slide laterally across the face of its seat when the air pressure is exerted on the air valve is avoided. A further object of my invention is to provide a dry pipe valve of the character aforesaid in which the water inlet is disposed in substantially axial alignment with the water outlet and in which the water and air valves are so arranged that when opened they will assume a position entirely out of alignment with the water way through the valve casing so that the water from the supply pipe is afforded an unobstructed passage from the point at which it enters the dry pipe valve casing to the point at which it emerges therefrom.

My invention further comprehends the provision in a dry pipe valve having air and water valves in angularly disposed relation when in closed position of means whereby the pressure exerted on the air valve to retain it on its seat may be transmitted to the water valve in such manner as to force the latter directly against its seat without tendency toward displacement of the valve thereon, certain of said means being cooperative with the water valve during the opening movement thereof to rapidly move the valve from its normal position above the seat to one in which it is inoperative to impede the flow of the incoming water.

A still further object of my invention is to generally improve and simplify the construction of dry pipe valves; to so dispose and arrange the various parts as to reduce the size and bulk of the valve casing; to simplify the construction of the valve so as to reduce the cost and facilitate the process of manufacture, and to provide novel means cooperative with the air valve for draining the valve casing while the air and water valves are closed and for automatically closing the drainage means upon the opening of the air valve.

My invention further includes such other various objects and novel features of construction and arrangement as may hereinafter appear or which are more specifically referred to or described.

Figure 2:
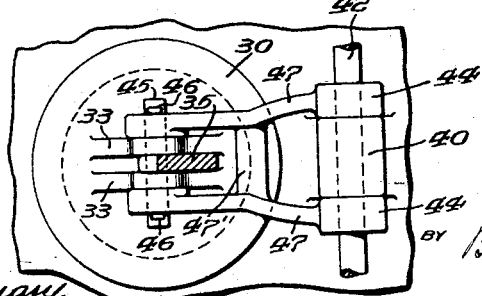

In the accompanying drawing I have illustrated a dry pipe valve embodying a preferred form of my invention, Fig. 1 being a vertical section through the valve with certain of the parts in elevation, the air and water valves being shown in full lines in normal, that is, closed position; their position when fully open is indicated in dotted lines. Fig. 2 is a fragmentary top plan view of the water valve and adjacent mechanism in closed position. Like numerals are used to indicate similar parts in the two figures.

Referring now more particularly to the drawing, the dry pipe valve shown therein comprises a main casing 1 provided with an inlet 2 which, when the valve is in use, is connected to a suitable water supply pipe, while above and in substantial vertical alignment with the inlet, the casing is provided with an outlet 3 which in use is connected to a distributing pipe. The casing may be considered as divided into upper and lower chambers 5 and 6 through the medium of a web and the air valve seat or ring hereinafter described, the upper chamber 5 being provided with a connection 7 positioned in the wall of the casing at substantially the height at which the upper chamber is kept filled with priming water, (as indicated by the broken line) under normal conditions of operation. Through this connection both the priming water and the air for filling the system may be conveniently introduced from suitable sources of supply. The chamber 6 may also be provided with a connection 8 for the attachment of the alarm valve usual in sprinkler systems while the inlet may also be provided with a connection 9 for convenient attachment of a suitable valve for testing the presence or absence of water in the supply pipe and inlet.

The upper and lower chambers of the valve casing are partially separated by an angularly disposed web 10 which is bored out and threaded to accommodate the annular air valve seat 12 which is arranged above the opening in the inlet 2 in such manner as to afford a clear passage through the seat from the inlet 2 to the outlet 3. Preferably also this seat is suitably angularly disposed with respect to the horizontal to slope upwardly from adjacent the point where the air valve is pivoted as hereinafter described, the angle of inclination in the valve shown in the drawing being substantially 35° with the horizontal.

The valve clapper of the air valve comprises a substantially disc shaped member 15 preferably having the under surface of its periphery beveled as at 16, a flexible annular gasket 17 of rubber or other suitable material being clamped between this beveled surface and a suitable ring 19 held in position by screws 20 or in any other convenient manner, the arrangement being such that the gasket is operative to contact with the upper face of the valve ring or seat 12 and form a tight closure when forced thereagainst. The valve clapper is carried by a suitable arm 22 one end of which is fixedly secured in any convenient way adjacent the center of the upper side of the valve clapper. In the drawing this end of the arm is shown as entered between a pair of ears 23 formed integrally with the clapper and secured thereto by a transversely extending pin 24 and key 25 but any other suitable means for securing the arm to the valve clapper may be employed if desired. From its point of attachment to the clapper the arm is curved in a generally downward direction to terminate adjacent a lug 27 formed near the bottom of the chamber 5, and to which the end of the arm is pivotally secured conveniently by a transversely extending pivot pin 28 secured in position by cotter pins 29 or in any other suitable way, the arrangement being such that the arm 22 is free to revolve about the axis of the pin to move the air valve clapper toward or away from its seat.

For closing the inlet 2 a suitable water valve 30 is provided of any convenient or desired form. As shown, this valve comprises a substantially circular metallic disc adapted to engage the upper face of an annular water valve seat 32 threaded into the wall of the casing adjacent the mouth of the inlet 2, and means are provided for connecting the water valve with the air valve in such manner as to enable the same to work in unison. Conveniently for this purpose the water valve is provided with a pair of centrally disposed, spaced upwardly projecting ears 33 between which is positioned one end of a link 35, the other end of this link being pivotally secured, as by a pivot pin 36 held in position by cotter pins 37, between a pair of downwardly directed spaced ears 38 formed integral with the air valve clapper adjacent its center, the position of the pins 24 and 36 being preferably such that a plane passed through the center of the valve ring 12 and normal to the upper face of the ring will also pass through both of the longitudinal axes of these pins.

Adjacent the bottom of the chamber 6 and near the lowest part of the valve 12 is positioned a boss 40 integral with the casing through which is extended a transversely directed shaft 42 the ends of which may conveniently terminate in the walls of the casing. This shaft is operative to rotatively support one end of a forked or bifurcated arm 44 the other end of which embraces the ears 33 and is secured thereto by a horizontally extending pivot pin 45 conveniently held in position by cotter pins 46. This pin extends entirely through both ends of the bifurcated link, the ears and the lower end of the link 35 thus maintaining all of these parts in respectively relatively movable pivoted relation. Preferably the bifurcated arm 44 is formed, as best shown in Fig. 2, of a pair of oppositely disposed similar laterally spaced members 47 connected by a web 47' and positioned on opposite sides of the boss 40.

In the preferred construction the centers of the pivot pins 45 and 36 are preferably disposed on an arc of which the axis of the shaft 42 is the center, this shaft being located in substantially horizontal alignment with or a little above the pin 45 and ordinarily above the pin 28 which of course lies in the upper chamber. Moreover, it will be observed that the arrangement of the parts is such that the pin 36 lies upon that side of the axis of the inlet or water way upon which is located the pivot 28 and that the said axis preferably passes substantially through the center of the pivot pin 45.

To enable the opening in the web 10 of the valve casing to be properly machined in the process of manufacture and threaded for the reception of the valve seat ring, the upper part of the casing is conveniently formed with an aperture 48 preferably in axial alignment with the seat ring 12 and through which a boring bar can be inserted, a plug 49 threaded into this opening serving to close it after the machining operation is completed, while for giving access when desired to the upper chamber one end of the casing is left open when the same is cast and is adapted to be closed by a cap 50 held in assembled position by bolts 51. By the removal of this cap the operator's hand may be readily inserted into the upper chamber for the purpose of manually closing the air valve onto its seat as hereinafter described. If desired the inner face of this cap may be provided with a lug 52 carrying a resilient stop 53 positioned to support the lever 22 when the valves are in extreme open position as indicated in dotted lines, the position of the stop being such as to permit the arm 22 and air valve to cross the vertical during the opening movement, so that once the limit of this movement is attained the weight of the several parts becomes operative to maintain the valves in open position until the air valve is manually returned to its seat.

For the purpose of draining the lower chamber of any water which may seep into the same past the water valve, I preferably provide a drain opening 60 in which is threaded a suitable hollow bushing 61 adapted to loosely receive and guide the lower end 62 of a valve plunger 64 on which is formed a conical valve 65 cooperative with the upper edge of the aperture in the bushing and adapted to close the opening therethrough when lowered to engagement therewith. The upper end of the valve plunger is provided with a vertically elongated slot 66 in which engages a pin 66' formed on one end of a lever 67 pivoted at 68 to a lug 69 conveniently integral with the wall of the casing. The opposite end of this lever is adapted to coact with a finger 70 conveniently integral with and projecting from the lower face of the air valve clapper, the parts being arranged in such manner that when the air valve is closed the finger will engage the lever and maintain the valve plunger lifted so as to keep the valve 65 off of its seat and permit the chamber to drain. Upon the opening of the air valve, however, the finger will move out of engagement with the lever after which the weight of the plunger is sufficient to lower the valve 65 on its seat and prevent the escape of water through the drain, which is again automatically opened upon the closing of the air valve. The bottom of the casing adjacent the lower part of the upper chamber is preferably provided with a connection 72 by means of which the upper chamber may be drained when desired, a suitable hand operated valve (not shown) being arranged to control this outlet.

When connected in a sprinkler system in the ordinary manner my improved dry pipe valve is adapted to function substantially as follows: The water being cut off from the supply, the cap 50 may be removed and the air valve manually moved down upon its seat, which operation is also effective to bring the water valve down upon its seat as well. The cap is now replaced and the upper chamber primed with water to a suitable depth, conveniently to about the level of the connection 7 through which the priming water is introduced, after which high pressure air is admitted to the system above the air valve conveniently through the same connection, the pressure employed ordinarily being some 25 lbs. to the square inch. As the air pressure builds up and gradually squeezes the air valve against its seat, a corresponding but greater force owing to the differential relation of the valves is exerted to drive the water valve onto its seat, but by reason of the relative angular disposition of the two valves this force is not exerted directly normal to the water valve seat but obliquely thereto, so that in the absence of the bifurcated arm 44 the horizontal component of this force would tend to cause the water valve to creep across the face of its seat. However, by reason of the interposition of the arm 44 this tendency is neutralized so that as a practical matter the vertical component of the force exerted on the water valve is alone effective to cause movement of the valve, and that movement is in turn effective only to force the valve against its seat, thus resulting in an extremely tight closure of the valve without relative lateral movement between the valve and its seat. The water in the supply pipe now being turned on, the dry pipe valve is in operative condition to function and release the water into the distributing portion of the system upon a sufficient diminution of the air pressure above the air valve.

When by reason of the opening of a sprinkler head or for other cause such diminution occurs, the pressure of water on the water valve is sufficient to lift both valves from their seats and cause the air valve, carrying with it the water valve, to turn about the pivot 28. It will be observed that the lower edge of the bifurcated arm 44 is normally but slightly above the upper surface of the water valve, in consequence of which during the turning movement of the arm 22 about the pivot 28, the water valve engages the lower edge of the arm and is thereby caused to rapidly assume a substantially vertical position thus effectually clearing the mouth of the inlet and affording a free passage or waterway from the mouth of the inlet through the ring 12 and thence through the outlet 3. Preferably the link 35 is provided with a lug 75 to form a stop for the water valve to prevent it, when the valves are fully opened as shown in dotted lines, from falling over to a position which might thereafter interfere either with the passage of the water through the waterway or the convenient closing of the valve when the valve is returned to its seat.

It will thus be evident that I have provided a dry pipe valve of the differential type and in which the air valve seat is disposed in oblique relation with the water valve seat and additionally so positioned as to afford a free and unobstructed waterway from the inlet to the outlet of the casing embodying means effective to cause the water valve to be securely and properly positioned on its seat as the air valve is closed against its seat and in which the valves and their connected operating means are so arranged that the water valve is rapidly moved out of alignment with the waterway upon the functioning of the dry pipe valve in its entirety, thus insuring the immediate, free and unobstructed passage of the water through the casing.

While I have herein described with considerable particularity a preferred embodiment of my invention I do not thereby desire or intend to limit myself to any precise details of construction or arrangement of parts, as the same may be modified or varied as required without departing from the spirit and scope of the invention as defined in the appended claims.

Having thus described my invention, I claim and desire to protect by Letters Patent of the United States:

1. A dry pipe valve comprising a casing having a water inlet and a water outlet thereabove and in substantial alignment therewith, said casing being provided with upper and lower chambers, a water valve seat disposed adjacent the mouth of said inlet, an air valve seat disposed above said water valve seat and in oblique relation therewith, an air valve cooperative with said air valve seat, an arm rigid with and carrying said air valve and pivoted in said upper chamber, a water valve cooperative with said water valve seat, a link connecting said air and water valves and relatively movable with respect to both, and an arm pivoted in said lower chamber and pivotally connected with the link operative to cause said water valve to follow a predetermined path substantially normal to said water valve seat when the air valve is forced against its seat.

2. A dry pipe valve having a casing comprising upper and lower chambers, the upper chamber provided with a water outlet and the lower chamber with a water inlet said inlet and outlet being in substantially vertical alignment, an air valve seat disposed between said inlet and said outlet and inclined to the horizontal, an air valve cooperative therewith, an arm secured to said valve and horizontally pivoted in said upper chamber, a water valve seat adjacent the mouth of the water inlet in the lower chamber, a water valve cooperative therewith, a loose connection between said water valve and said air valve, and pivoted means extending to and connected with the water valve and disposed in said lower chamber whereby said water valve is compelled to move in a path substantially normal to the surface of the water valve seat when said air valve is forced against its seat.

3. A dry pipe valve having a casing comprising upper and lower chambers and provided with a water outlet and a water inlet in substantially vertical alignment, an air valve seat disposed between said inlet and said outlet and inclined to the horizontal, an air valve cooperative therewith, an arm secured to said valve and horizontally pivoted in said upper chamber, a horizontally disposed water valve seat adjacent the mouth of the water inlet in the lower chamber, a water valve cooperative therewith, a loose connection between said water valve and said air valve, and means within said lower chamber comprising an arm movable about a horizontal pivot and pivotally secured to said connecting means whereby said water valve is prevented from lateral movement across the face of the water valve seat when the air valve is forced against its seat.

4. A dry pipe valve comprising a casing having upper and lower chambers, an outlet in the upper chamber and an inlet in the lower chamber, an air valve seat disposed between said inlet and outlet and in angular relation with the horizontal, an arm pivoted in said upper chamber, an air valve carried by said arm and cooperative with said seat, a water valve seat in the lower chamber adjacent the mouth of the inlet, a water valve cooperative with said seat, a link pivotally connected to said air and water valves and forming a loose connection therebetween, and an arm horizontally pivoted at one end in said lower chamber, extending to the link and pivotally connected therewith, said arm being operative on the opening of the air valve to engage the water valve to turn said water valve to a substantially vertical position as the air valve approaches the limit of its opening movement and to prevent said water valve from lateral movement with respect to the water valve seat during the final closing movement of the air valve.

5. A dry pipe valve comprising a casing provided with upper and lower chambers, a water valve seat disposed in the lower chamber, an air valve seat disposed above the water valve seat and in oblique relation therewith, an air valve cooperative with said air valve seat, an arm rigidly connected with and carrying said air valve and pivoted in the upper chamber, a water valve cooperative with the water valve seat, means connecting the air and water valves and relatively movable with respect to both, and means pivoted in the lower chamber and connected to the water valve operative to cause the water valve to move in a path substantially normal to its seat when the air valve is forced against its seat.

6. A dry pipe valve having a casing comprising upper and lower chambers, an air valve seat disposed between said chambers and inclined to the horizontal, an air valve cooperative therewith, a water valve seat in the lower chamber, a water valve cooperative therewith, means connecting said air and water valves and relatively movable with respect thereto, and horizontally pivoted means in the lower chamber connected with the water valve and operative to prevent said valve from moving across the face of its seat when the air valve is forced against its seat.

7. A dry pipe valve having a casing comprising upper and lower chambers, an air valve seat disposed between said chambers and inclined to the horizontal, an air valve cooperative therewith, a water valve seat in the lower chamber, a water valve cooperative therewith, means connecting said air and water valves and relatively movable with respect thereto, and means rotatable on a horizontal pivot and connected with said water valve operative to prevent said water valve from moving laterally across its seat when the air valve is forced against its seat.

In witness whereof, I have hereunto set my hand this 10th day of November, 1921.

LEROY M. LEWIS.